# (12) United States Patent
Rowland

(10) Patent No.: US 9,800,957 B2
(45) Date of Patent: Oct. 24, 2017

(54) OPERATING A NETWORK NODE

(71) Applicant: METASWITCH NETWORKS LTD., Enfield (GB)

(72) Inventor: Jon Rowland, Enfield (GB)

(73) Assignee: METASWITCH NETWORKS LTD, Enfield, Middlesex (GB)

( * ) Notice: Subject to any disclaimer, the term of this patent is extended or adjusted under 35 U.S.C. 154(b) by 0 days.

(21) Appl. No.: 15/239,401

(22) Filed: Aug. 17, 2016

(65) Prior Publication Data

US 2017/0055047 A1    Feb. 23, 2017

(30) Foreign Application Priority Data

Aug. 18, 2015  (GB) .................................. 1514678.0

(51) Int. Cl.
*H04Q 3/76* (2006.01)
*H04Q 3/10* (2006.01)
*H04L 29/06* (2006.01)
*H04M 3/42* (2006.01)

(52) U.S. Cl.
CPC ........... *H04Q 3/76* (2013.01); *H04L 65/1006* (2013.01); *H04L 65/1016* (2013.01); *H04M 3/42314* (2013.01); *H04Q 3/10* (2013.01); *H04M 2207/45* (2013.01); *H04Q 2213/1322* (2013.01); *H04Q 2213/13222* (2013.01); *H04Q 2213/13286* (2013.01)

(58) Field of Classification Search
CPC .. H04Q 3/76; H04Q 3/10; H04Q 2213/13222; H04Q 2213/1322; H04Q 2213/13286; H04M 3/42314; H04M 2207/45; H04L 65/1016; H04L 65/1006

USPC .......................... 379/221.03, 221.04, 221.14
See application file for complete search history.

(56) References Cited

U.S. PATENT DOCUMENTS

| | | | | |
|---|---|---|---|---|
| 7,218,723 | B2 * | 5/2007 | Varble ................. | H04M 7/0066 370/352 |
| 8,059,798 | B1 | 11/2011 | Skubisz et al. | |
| 2006/0072732 | A1 | 4/2006 | Varble et al. | |
| 2006/0098791 | A1 * | 5/2006 | Elder ...................... | H04M 3/24 379/37 |
| 2007/0071182 | A1 * | 3/2007 | Elder ..................... | H04M 11/04 379/45 |
| 2007/0286385 | A1 * | 12/2007 | Varble ................. | H04M 7/0066 379/201.12 |

(Continued)

*Primary Examiner* — Harry S Hong
(74) *Attorney, Agent, or Firm* — EIP US LLP

(57) ABSTRACT

Measures for use in operating a network node in a telecommunications network. At a network node located in a second part of the network, signaling messages transmitted between a server and end devices in an at least a first group are monitored. Each monitored signaling message includes a telephone dialing number for a given end device in the at least first group and an extension number for the given end device. On the basis of the monitoring, mapping data is stored which includes mappings between telephone dialing numbers and extension numbers for end devices in the at least first group. In response to detecting a loss of connectivity between a first part of the telecommunications network and the second part of the telecommunications network, extension number dialing request messages received from end devices in the first group are processed according to a detected loss of connectivity operating mode.

22 Claims, 2 Drawing Sheets

(56) References Cited

U.S. PATENT DOCUMENTS

2008/0305751 A1* 12/2008 Naumann ............... H04W 4/10
455/90.2

* cited by examiner

OPERATING A NETWORK NODE

CROSS-REFERENCE TO RELATED APPLICATIONS

This application claims priority under 35 U.S.C. §119(a) to UK Patent Application No. GB1514678.0, filed on Aug. 18, 2015, the entire content of which is hereby incorporated by reference.

BACKGROUND OF THE INVENTION

Field of the Invention

The present disclosure relates to operating a network node. In particular, but not exclusively, the present disclosure relates to measures for operating a network node in a telecommunications network.

Description of the Related Technology

Hosted business is a way of providing a telephone system for a company/office similar to that provided in the past by on-premises private branch exchange (PBX) devices, but with the service logic hosted in the telecoms service provider's network, rather than with expensive equipment being deployed in each business enterprise. This allows each worker to have their own phone with its own directory number, but also provides additional services such as:

Intercom dialing which is the ability to have a shorter (hence easier-to-remember) extension number for each phone that can be used when calls are made between two phones in the same business.

Automatic call distribution, for example involving call queuing, audio menus, and call direction to groups of phones to allow for "call center" functionality.

Call pick-up which is the ability for someone to answer a colleague's ringing phone on their own handset.

The Metaswitch™ Call Feature Server (CFS) provides hosted business functionality, and has the concept of a "business group" which represents a particular external business/company who is receiving hosted business services from the telecoms service provider deploying the CFS. Each business group contains a number of lines corresponding to the phones on the desks of the workers in the business. Each line is in a single business group because that worker belongs to that firm.

Emergency standalone (ESA) is a feature of networks that allows parts of the network (for example edge network "satellite" sites) to continue to function, providing basic phone services when disconnected from the core network.

For example, there may be a set of Media Gateway Control Protocol (MGCP) lines, or Session Initiation Protocol (SIP) phones that are physically connected to the network in one location, but the knowledge of which physical phone corresponds to which subscriber record and the routing functions of the telephone network are in some other "core" location/network. In distributed networks such as Internet Protocol Multimedia Subsystem (IMS) or Metasphere Clustered CFS™ deployments, there may be Access Gateway Controllers (AGCs) in the edge network providing service for those MGCP (etc.) lines.

SUMMARY

According to embodiments of the present disclosure, there is a method of operating a network node in a telecommunications network, wherein the telecommunications network comprises a server responsible for providing telephony services including extension number dialing telephony services to a plurality of end devices, wherein the server is located in a first part of the telecommunications network, wherein the plurality of end devices comprises at least a first group of end devices located in a second part of the telecommunications network, and wherein the first part is remote from the second part, the method comprising, at a network node located in the second part of the network: monitoring signaling messages transmitted between the server and end devices in the at least first group, each monitored signaling message comprising a telephone dialing number for a given end device in the at least first group and an extension number for the given end device; on the basis of the monitoring, storing mapping data comprising mappings between telephone dialing numbers and extension numbers for end devices in the at least first group; and in response to detecting a loss of connectivity between the first part of the telecommunications network and the second part of the telecommunications network, processing extension number dialing request messages received from end devices in the first group according to a detected loss of connectivity operating mode, wherein the detected loss of connectivity operating mode processing is carried out at least in part on the basis of the stored mapping data.

According to embodiments of the present disclosure, there is a system for use in operating a network node in a telecommunications network, wherein the telecommunications network comprises a server responsible for providing telephony services including extension number dialing telephony services to a plurality of end devices, wherein the server is located in a first part of the telecommunications network, wherein the plurality of end devices comprises at least a first group of end devices located in a second part of the telecommunications network, wherein the first part is remote from the second part, wherein the system comprises at least one memory including computer program code; and at least one processor in data communication with the at least one memory, wherein the at least one processor is configured to, at a network node located in the second part of the network: monitor signaling messages transmitted between the server and end devices in the at least first group, each monitored signaling message comprising a telephone dialing number for a given end device in the at least first group and an extension number for the given end device; on the basis of the monitoring, store mapping data comprising mappings between telephone dialing numbers and extension numbers for end devices in the at least first group; and in response to detecting a loss of connectivity between the first part of the telecommunications network and the second part of the telecommunications network, process extension number dialing request messages received from end devices in the first group according to a detected loss of connectivity operating mode, wherein the detected loss of connectivity operating mode processing is carried out at least in part on the basis of the stored mapping data.

According to embodiments of the present disclosure, there is a non-transitory computer-readable storage medium comprising computer-executable instructions which, when executed by a processor, cause a computing device to perform a method of operating a network node in a telecommunications network, wherein the telecommunications network comprises a server responsible for providing telephony services including extension number dialing telephony services to a plurality of end devices, wherein the server is located in a first part of the telecommunications network, wherein the plurality of end devices comprises at least a first group of end devices located in a second part of the telecommunications network, and wherein the first part is remote from the second part, the method comprising, at a network node located in the second part of the network: monitoring signaling messages transmitted between the server and end devices in the at least first group, each monitored signaling message comprising a telephone dialing number for a given end device in the at least first group and an extension number for the given end device; on the basis of the monitoring, storing mapping data comprising mappings between telephone dialing numbers and extension numbers for end devices in the at least first group; and in response to detecting a loss of connectivity between the first part of the telecommunications network and the second part of the telecommunications network, processing extension number dialing request messages received from end devices in the first group according to a detected loss of connectivity operating mode, wherein the detected loss of connectivity operating mode processing is carried out at least in part on the basis of the stored mapping data.

Further features of embodiments of the present disclosure will become apparent from the following description of preferred embodiments, given by way of example only, which is made with reference to the accompanying drawings.

DETAILED DESCRIPTION OF CERTAIN INVENTIVE EMBODIMENTS

Figure 1:
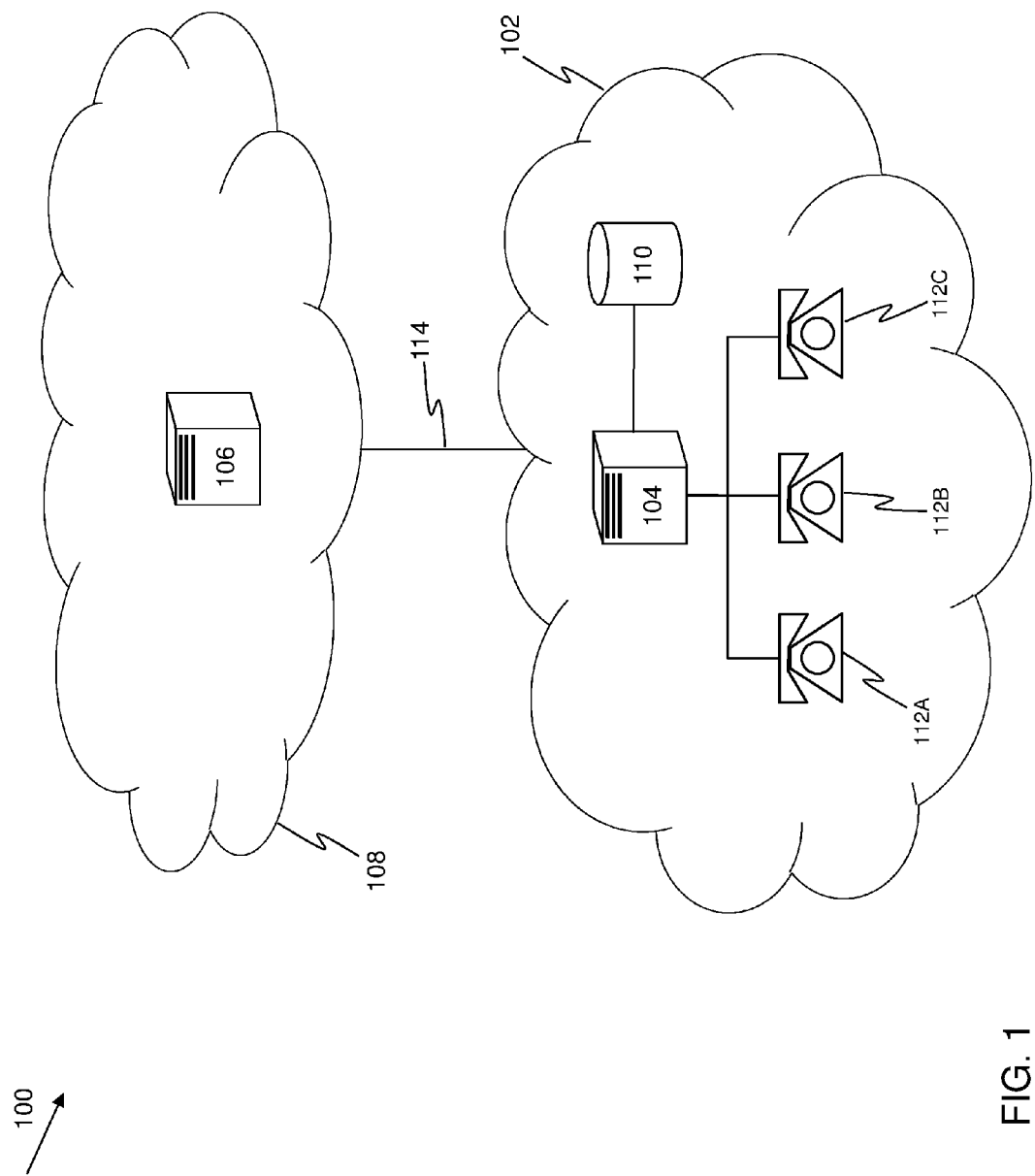
FIG. 1 shows a system diagram according to embodiments.

FIG. 1 shows a system diagram of a telecommunications network 100 according to embodiments. Telecommunications network 100 comprises a first network part 108 and a second network part 102 connected via a communications link 114. Communications link (or links) 114 may comprise one or more gateway entities and/or one or more other networks (e.g. an Internet Protocol (IP) network) (not shown). First network part 108 is remote from second network part 102. Telecommunications network 100 may comprise one or more further network parts (not shown).

First network part 108 comprises a server 106 which is responsible for providing telephony services including extension number dialing telephony services to a plurality of end devices. Server 106 may for example comprise a softswitch, gateway, application server or other such network entity which is capable of providing telephony services to a plurality of end devices.

Second network part 101 comprises a network node 104 which may for example comprise a proxy, server, softswitch, gateway, application server or other such network entity which is capable of processing signaling information for calls and/or communication sessions in network 100. Network node 104 is capable of communicating with data store 110, for example to store data therein or retrieve data therefrom. In embodiments, data store 110 is located locally to network node 104.

Network node 104 is also capable of communicating with a first group of end devices 112A, 112B, 112C, located in second network part 102, for example via one or more wireless or wired communication links. In practice, network part 102 could have a different number of end devices. The user devices can also be referred to as endpoint devices, terminal devices, user agents, user devices, subscriber devices, user equipment or endpoints.

Network node 104 is also capable of communicating with a second group of end devices (not shown), for example via one or more wireless or wired communication links. In some embodiments, the second group of end devices is located in second network part 102. In other embodiments the second group of end devices is located in a different network part (not shown) from second network part 102.

Embodiments comprise measures, including methods, apparatus and computer programs and computer program products, for use in operating a network node 104 in a telecommunications network 100. Telecommunications network 100 comprises a server 106 responsible for providing telephony services including extension number dialing telephony services to a plurality of end devices. Server 106 is located in a first part 108 of telecommunications network 100. The plurality of end devices comprises at least a first group of end devices 112A, 112B, 112C located in a second part 102 of telecommunications network 100. First part 108 is remote from second part 102.

At network node 104 located in second part 102 of telecommunications network 100, signaling messages transmitted between server 106 and end devices in the at least first group are monitored. Each monitored signaling message comprises a telephone dialing number for a given end device in the at least first group and an extension number for the given end device.

In embodiments, the monitored signaling messages comprise one or more Session Initiation Protocol (SIP) REGISTER response messages or SIP 200 OK messages.

On the basis of the monitoring, network node 104 stores mapping data comprising mappings between telephone dialing numbers and extension numbers for end devices in the at least first group. In embodiments, the mapping data is stored in data store 110.

In response to detecting a loss of connectivity between first part 108 of telecommunications network 100 and second part 102 of telecommunications network 100, network node 104 processes extension number dialing request messages received from end devices in the first group according to a detected loss of connectivity operating mode. The detected loss of connectivity operating mode processing is carried out at least in part on the basis of the stored mapping data.

In embodiments, each monitored signaling message comprises an end device group identifier for the at least first group of end devices in which the given end device is comprised; in such embodiments, the stored mapping data comprises mappings between telephone dialing numbers, extension numbers and end device group identifiers for end devices in the at least first group.

In embodiments, the detected loss of connectivity operating mode processing is carried out at least in part on the basis of an end device group identifier for the at least first group of end devices.

In embodiments, the end device group identifier for the at least first group of end devices is comprised in a SIP message such as a SIP REGISTER message.

In embodiments, the end device group identifier for the at least first group of end devices is comprised in a SIP REGISTER response message.

In embodiments, the end device group identifier for the at least first group of end devices is comprised in one or more of the following header fields of a respective SIP REGISTER response message:

a P-Associated-URI header field,
a To: header field,
a From: header field, and
a Contact header field.

The header fields listed above are examples of header fields where the end device group identifiers could be placed; other header fields could be employed. Similarly, the extension numbers could be comprised in these or other header fields. End device group identifiers and extension numbers could be contained in the same or different header fields.

In embodiments, the detected loss of connectivity operating mode processing comprises receiving an extension number dialing call setup request message directed to an extension number for a destination end device in the at least first group, obtaining, on the basis of the received extension number for the destination end device, a telephone dialing number for the destination end device from the stored mapping data, and routing a call setup request to the destination end device on the basis of the obtained telephone dialing number for the destination end device.

In embodiments, the extension number dialing call setup request message is received from an originating end device in the at least first group, the extension number dialing call setup request message comprises a telephone dialing number for the originating end device, and the obtaining comprises performing, on the basis of the telephone dialing number for the originating end device, a first lookup in the stored mapping data to obtain an identifier for the group of end devices in which the originating end device is comprised.

In embodiments, the obtaining comprises performing, on the basis of the identifier for the group of end devices obtained from the first lookup and the received extension number, a second lookup in the stored mapping data to obtain a telephone dialing number for the destination end device, and the routing is performed on the basis of the telephone dialing number for the destination end device obtained from the second lookup.

In embodiments, each received extension number dialing call setup request message comprises an extension number for a destination end device in the at least first group, and an extension number for a respective end device contains fewer digits than a telephone dialing number for the respective end device. The extension number may also be referred to as an intercom dialing number or a short-code.

In embodiments, the detected loss of connectivity operating mode comprises an emergency standalone operating mode.

In embodiments, first part 108 of telecommunications network 100 comprises a core network.

In embodiments, second part 102 of telecommunications network 100 comprises one or more of a local network, an edge network and a satellite site network.

In embodiments, network node 104 located in second part 102 of telecommunications network 100 comprises a SIP proxy node.

In embodiments, one or more entities communicate with first part 108 of telecommunications network 100 using SIP over IP. Embodiments provide a generic solution for ESA for the SIP-talking end devices in second part 102 (for example a 'satellite site' or 'local edge network'). Embodiments implement a solution for this that involves network node 104 (for example an ESA SIP Proxy component) located in the satellite site between the endpoint devices and the core network. In embodiments, proxy node 104 has access to SIP flows in and out of second part 102 and it dynamically learns which subscribers exist in the local edge network by watching SIP REGISTER messages go by. This means that when ESA mode is invoked, network node 104 has enough information to route local calls between these subscribers. FIG. 1 shows an example topology for such embodiments.

In embodiments, the registration information that the ESA SIP Proxy sees only contains the subscriber's main phone number. This means that by default for hosted business deployments, the ESA SIP Proxy does not know about intercom codes that might be used for short-code (aka intercom-code/extension) dialing within the business group (note that each line can only be in exactly 1 business group).

In embodiments, the core network provides the intercom code (e.g. on the REGISTER response), which allow the ESA SIP Proxy to know the mapping between an intercom code and the full directory number, but that is insufficient because when the phone makes an intercom-dialed call, there is no context from the phone as to which business group this is for (and intercom codes can be the same in multiple business groups). Some embodiments solve this by provisioning this information onto the ESA SIP Proxy. However, other embodiments solve this with a 'light-touch' from a configuration point of view in order to facilitate easier deployment.

Embodiments enable the ESA SIP Proxy to route intercom-dialed calls when in ESA mode without requiring any special behavior from the endpoints/phones over which there may be no control.

In embodiments, first part 108 (e.g. a core network) of telecommunications network 100 provides information on the SIP REGISTER response that for the particular directory number registering indicates both what its intercom code is, and a unique identifier representing the business group it is in. In embodiments, the business group corresponds to a first group of end devices, so the unique identifier uniquely identifies the at least first group of end devices (for example a group of end devices comprising end devices 112A, 112B and 112C).

Figure 2:
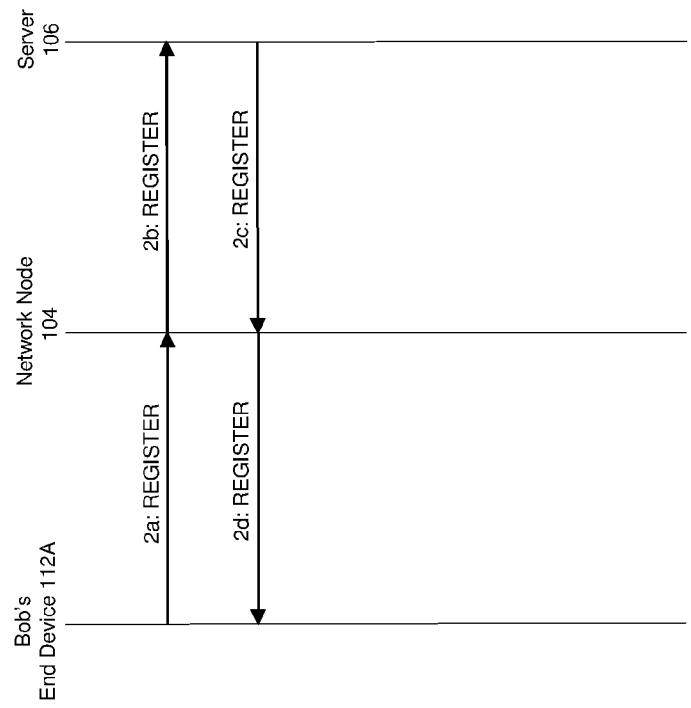
FIG. 2 shows a message flow diagram according to embodiments.

FIG. 2 shows a message flow diagram according to embodiments. In these embodiments, Bob has an end device 112A located in first part 102 of telecommunications network 100. End device 112A registers with the core network 108 by transmitting a SIP REGISTER message to network node 104 in step 2a. Network node 104 forwards the SIP REGISTER message on to server 106 in first part 108 in step 2b. Server 106 transmits a SIP 200 OK response message to network node 104 in step 2c which network node 104 forwards on to end device 112A in step 2d.

Message data for these embodiments is given below where Bob is registering his SIP business phone (112A) with the core network 108, his directory number is "2015551234", his intercom code is "888" and his business has a unique identifier of "Shop-Retail".

Message data for an example SIP REGISTER message is as follows:

```
REGISTER sip:ss2.biloxi.example.com SIP/2.0
Via: SIP/2.0 client.biloxi.example.com:5061;branch=z9hG4bKnashds7
Max-Forwards: 70
From: Bob <sip:2015551234@biloxi.example.com>;tag=a73kszlfl
To: Bob <sip:2015551234@biloxi.example.com>
Call-ID: 1j9FpLxk3uxtm8tn@biloxi.example.com
CSeq: 1 REGISTER
Contact: <sip:2015551234@client.biloxi.example.com>
```

Message data for an example SIP 200 OK (response) message is as follows:

```
SIP/2.0 200 OK
Via: SIP/2.0 client.biloxi.example.com:5061;branch=z9hG4bKnashd92;
received=192.0.2.201
From: Bob <sip:2015551234@biloxi.example.com>;tag=ja743ks76zlflH
To: Bob <sip:2015551234@biloxi.example.com>;tag=37GkEhw16
P-Associated-URI: <sip:888@biloxi.example.com>;bg=Shop-Retail
Call-ID: 1j9FpLxk3uxtm8tn@biloxi.example.com
CSeq: 2 REGISTER
Contact: <sips:2015551234@client.biloxi.example.com>;expires=3600
```

In the above embodiments, additional information identifying the group of end devices (or 'business group') in which end device 112A is comprised in a P-Associated-Uniform resource identifier (URI) header (see bold text in SIP 200 OK message data above). In other embodiments, the additional information is encoded in the message in whatever way the ESA SIP Proxy is implemented to understand, for example by attaching a similar "bg=" parameter to any of the "To:", "From:" or "Contact:" headers in a 200 OK response.

Upon receiving this additional information when it sees the 200 OK response flow past, network node 104 records this information by storing it in data store 110.

In some embodiments, network node 104 removes the additional information from the response message before passing it back to end device 112A to avoid any interoperability issues (for example, some end devices may not correctly ignore the additional information).

In embodiments, the detected loss of connectivity operating mode processing comprises removing the end device group identifier for the at least first group from signaling messages received from the server before transmitting the signaling messages on to the appropriate end devices in the at least first group.

At some point, network node 104 loses contact with the core network 108 and is hence in ESA mode according to embodiments. A subscriber then makes a new intercom-dialed call, and in embodiments, network node 104 uses the following logic to route the call (SIP dictates that from the INVITE message in hand for the new call it will have the originating full directory number (DN) of the subscriber, and the dialed intercom code and that is probably all):

Look up the originating subscriber based on its DN in the proxy's (dynamically-created-from-registers) data store;

Pull which business group the originating subscriber is in from that information;

Perform a lookup of the dialed intercom code in the data store, looking at all subscribers who also had that unique business group ID in their register response; and Find the DN of that destination subscriber, and route the call onwards to it.

In embodiments, if Bob (as above) calls Alice (DN: 2015556789, intercom code: 777) in his own business, the following would occur:

Bob's phone sends a SIP INVITE destined for "777" in the request URI (with Bob's DN of 2015551234 in the From: header);

Network node 104 knows it has lost contact with the core network, so knows to do local routing itself when it receives that INVITE;

Network node 104 tries to match the 777 destination against a directory number in its registration cache and finds no match, so falls back to trying intercom code routing;

Network node 104 looks up Bob's directory number (in the From: header) in its registration cache and finds that Bob is part of the business group "Shop-Retail";

Network node 104 looks in its registration cache for an intercom code of 777 which is also part of the business group "Shop-Retail";

Network node 104 finds the record for Alice and extracts her DN of 2015556789 and contact IP address details; and Network node 104 routes the INVITE on to Alice's phone.

Embodiments therefore enable intercom dialing in ESA mode with minimal configuration on network node 104.

Embodiments can be employed in emergency call routing where server 106 returns additional information in one or more REGISTER responses associated with one or more particular subscribers:

When operating in ESA mode, there may be no connectivity with trunks normally used to route emergency calls.

A known approach in such a scenario is to configure a local area number (i.e. one of the phones connected through the ESA SIP proxy) to take emergency calls in this instance (for example the local sheriff's office).

Embodiments avoid the need to configure which line is the emergency fallback line on network node 104 itself: server 106 returns a special identifier known to the network node 104 in the REGISTER response for the fallback line (for example via a "; emergency-fallback=yes" parameter in the From: header). In embodiments, this parameter is only valid between the ESA SIP Proxy and the core network, so there is no security exposure via spoofing in the access network here. Then, when network node 104 sees a call destined for an emergency number when operating in ESA mode, it knows to route it to the subscriber it learned earlier from the REGISTER response.

In embodiments, the monitored signaling messages comprise at least one signaling message comprising an emergency fallback parameter and an identifier for an end device in the at least first group which is to be used for emergency calling, and the storing of mapping data comprises storing a mapping between the emergency calling fallback parameter and a telephone dialing number for the end device which is to be used for emergency calling. In such embodiments, the detected loss of connectivity operating mode processing comprises receiving, an emergency call setup request message directed to a known emergency calling number, obtaining, on the basis of the received known emergency number and the emergency fallback parameter, a telephone dialing number for the end device which is to be used for emergency calling from the stored mapping data, and routing a call setup request to the end device which is to be used for emergency calling on the basis of the obtained telephone dialing number for the end device which is to be used for emergency calling.

In some such embodiments, the identifier for the end device which is to be used for emergency calling comprises a telephone dialing number or an extension number for the end device which is to be used for emergency calling Embodiments can be employed in IMS network intercom code configuration. In an IMS network with business services, there may be several application servers providing services to the same set of subscribers. These subscribers may want intercom-dialing, and hence multiple servers may need to know intercom code mappings. Learning these mappings from REGISTER responses according to embodiments provides a mechanism for helping to avoid dual provisioning.

In embodiments, telecommunications network 100 comprises an Internet Protocol Multimedia Subsystem (IMS) network which comprises at least a further server (not shown) responsible for providing telephony services including extension number dialing telephony services to the plurality of end devices. In such embodiments, the further server is located in a third part of the network (not shown) which is remote from second part 102 of telecommunications network 100. In such embodiments, the monitoring comprises monitoring signaling messages transmitted between the further server and end devices in the at least first group, and the detected loss of connectivity operating mode processing is carried out further in response to detecting a loss of connectivity between the third part of the telecommunications network and second part 102 of telecommunications network 100.

In embodiments, the plurality of end devices comprises a second group of end devices. Embodiments comprise further monitoring signaling messages transmitted between the server and end devices in the second group; in such embodiments, each further monitored signaling message comprises a telephone dialing number for a given end device in the second group, an extension number for the given end device in the second group and an end device group identifier for the second group of end devices in which the given end device is comprised. Such embodiments comprise, on the basis of the further monitoring, further storing mapping data comprising mappings between telephone dialing numbers, extension numbers and end device group identifiers for end devices in the second group, and in response to further detecting a loss of connectivity between the first part of the telecommunications network and a part of the telecommunications network in which the second group is located, further processing extension number dialing request messages received from end devices in the second group according to a further detected loss of connectivity operating mode. The further detected loss of connectivity operating mode processing is carried out at least in part on the basis of the further stored mapping data.

In some embodiments, the second group of end devices is located in the second part of the telecommunications network. In other embodiments, the second group of end devices is located in a fourth part of the telecommunications network; in such embodiments, the fourth part is remote from the second part.

One or more of the aspects of the embodiments described herein with reference to the drawings comprise processes performed by one or more network nodes. In embodiments, the one or more network nodes comprise one or more processing systems or processors configured to carry out these processes. In this regard, embodiments may be implemented at least in part by computer software stored in (non-transitory) memory and executable by the processor, or by hardware, or by a combination of tangibly stored software and hardware (and tangibly stored firmware). Embodiments also extend to computer programs, particularly computer programs on or in a carrier, adapted for putting the above described embodiments into practice. The program may be in the form of non-transitory source code, object code, or in any other non-transitory form suitable for use in the implementation of processes according to embodiments. The carrier may be any entity or device capable of carrying the program, such as a RAM, a ROM, or an optical memory device; etc. Memory, as referred to above may comprise any suitable storage medium, including solid-state drives (SSD) or other semiconductor-based RAM; a ROM, for example a CD ROM or a semiconductor ROM; or a magnetic recording medium, for example a floppy disk or hard disk.

The above embodiments are to be understood as illustrative examples. Further embodiments are envisaged.

Embodiments can be extended to any scenario where a core network has sub scriber-scoped configuration/knowledge that is useful to a network node such as an ESA Proxy located remotely to the core network, or other service.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of embodiments, which is defined in the accompanying claims.

What is claimed is:

1. A method of operating a network node in a telecommunications network,
    wherein the telecommunications network comprises a server responsible for providing telephony services including extension number dialing telephony services to a plurality of end devices,
    wherein the server is located in a first network in the telecommunications network,
    wherein the plurality of end devices comprises at least a first group of end devices located in a second, different network in the telecommunications network, and
    wherein the first network is connected to the second network by a communications link,
    the method comprising, at a network node located in the second network in the telecommunications network:
    monitoring signaling messages transmitted between the server and end devices in the at least first group, each monitored signaling message comprising a telephone dialing number for a given end device in the at least first group and an extension number for the given end device;
    on the basis of the monitoring, storing mapping data comprising mappings between telephone dialing numbers and extension numbers for end devices in the at least first group; and
    in response to detecting a loss of connectivity in the communications link between the first network in the telecommunications network and the second network in the telecommunications network, processing extension number dialing request messages received from end devices in the first group according to a detected loss of connectivity operating mode, wherein the detected loss of connectivity operating mode processing is carried out at least in part on the basis of the stored mapping data.

2. The method of claim 1, wherein each monitored signaling message comprises an end device group identifier for the at least first group of end devices in which the given end device is comprised, and
    wherein the stored mapping data comprises mappings between telephone dialing numbers, extension numbers and end device group identifiers for end devices in the at least first group.

3. The method of claim 2, wherein the detected loss of connectivity operating mode processing is carried out at least in part on the basis of an end device group identifier for the at least first group of end devices.

4. The method of claim 1, wherein the detected loss of connectivity operating mode processing comprises:
    receiving, an extension number dialing call setup request message directed to an extension number for a destination end device in the at least first group;

obtaining, on the basis of the received extension number for the destination end device, a telephone dialing number for the destination end device from the stored mapping data; and routing a call setup request to the destination end device on the basis of the obtained telephone dialing number for the destination end device.

5. The method of claim 4,
wherein the extension number dialing call setup request message is received from an originating end device in the at least first group,
wherein the extension number dialing call setup request message comprises a telephone dialing number for the originating end device, and
wherein the obtaining comprises performing, on the basis of the telephone dialing number for the originating end device, a first lookup in the stored mapping data to obtain an identifier for the group of end devices in which the originating end device is comprised.

6. The method of claim 5, wherein the obtaining comprises performing, on the basis of the identifier for the group of end devices obtained from the first lookup and the received extension number, a second lookup in the stored mapping data to obtain a telephone dialing number for the destination end device, and
wherein the routing is performed on the basis of the telephone dialing number for the destination end device obtained from the second lookup.

7. The method of claim 1, wherein each received extension number dialing call setup request message comprises an extension number for a destination end device in the at least first group, and
wherein an extension number for a respective end device contains less digits than a telephone dialing number for the respective end device.

8. The method of claim 2, wherein the detected loss of connectivity operating mode processing comprises removing the end device group identifier for the at least first group from signaling messages received from the server before transmitting the signaling messages on to the appropriate end devices in the at least first group.

9. The method of claim 1, wherein the monitored signaling messages comprise at least one signaling message comprising an emergency fallback parameter and an identifier for an end device in the at least first group which is to be used for emergency calling,
wherein the storing of mapping data comprising storing a mapping between the emergency calling fallback parameter and a telephone dialing number for the end device which is to be used for emergency calling,
wherein the detected loss of connectivity operating mode processing comprises:
receiving, an emergency call setup request message directed to a known emergency calling number,
obtaining, on the basis of the received known emergency number and the emergency fallback parameter, a telephone dialing number for the end device which is to be used for emergency calling from the stored mapping data, and
routing a call setup request to the end device which is to be used for emergency calling on the basis of the obtained telephone dialing number for the end device which is to be used for emergency calling.

10. The method of claim 9, wherein the identifier for the end device which is to be used for emergency calling comprises a telephone dialing number or an extension number for the end device which is to be used for emergency calling.

11. The method of claim 1, wherein the telecommunications network comprises an Internet Protocol Multimedia Subsystem (IMS) network which comprises at least a further server responsible for providing telephony services including extension number dialing telephony services to the plurality of end devices,
wherein the further server is located in a third network in the telecommunications network, wherein the third network is connected to the second network in the network,
wherein the monitoring comprises monitoring signaling messages transmitted between the further server and end devices in the at least first group, and
wherein the detected loss of connectivity operating mode processing is carried out further in response to detecting a loss of connectivity between the third network in the telecommunications network and the second network in the telecommunications network.

12. The method of claim 1, wherein the detected loss of connectivity operating mode comprises an emergency stand-alone operating mode.

13. The method of claim 1, wherein the monitored signaling messages comprise one or more Session Initiation Protocol (SIP) REGISTER response messages or SIP 200 OK messages.

14. The method of claim 13, wherein each monitored signaling message comprises an end device group identifier for the at least first group of end devices in which the given end device is comprised,
wherein the stored mapping data comprises mappings between telephone dialing numbers, extension numbers and end device group identifiers for end devices in the at least first group, and
wherein the end device group identifier for the at least first group of end devices is comprised in one or more of the following header fields of a respective SIP REGISTER response message:
a P-Associated-URI header field,
a To: header field,
a From: header field, and
a Contact header field.

15. The method of claim 1, wherein the first network in the telecommunications network comprises a core network.

16. The method of claim 1, wherein the second network in the telecommunications network comprises one or more of a local network, an edge network and a satellite site network.

17. The method of claim 1, wherein the network node located in the second network in the telecommunications network comprises a SIP proxy node.

18. The method of claim 2, wherein the plurality of end devices comprises a second group of end devices, the method comprising:
further monitoring signaling messages transmitted between the server and end devices in the second group, each further monitored signaling message comprising a telephone dialing number for a given end device in the second group, an extension number for the given end device in the second group and an end device group identifier for the second group of end devices in which the given end device is comprised;
on the basis of the further monitoring, further storing mapping data comprising mappings between telephone dialing numbers, extension numbers and end device group identifiers for end devices in the second group; and in response to further detecting a loss of connectivity in the communications link between the first network in the telecommunications network and a network in the telecommunications network in which the second group is located, further processing extension number dialing request messages received from end devices in the second group according to a further detected loss of connectivity operating mode, wherein the further detected loss of connectivity operating mode processing is carried out at least in part on the basis of the further stored mapping data.

19. The method of claim 18, wherein the second group of end devices is located in the second network in the telecommunications network.

20. The method of claim 18, wherein the second group of end devices is located in a fourth network in the telecommunications network, wherein the fourth network is connected to the second network.

21. A system for use in operating a network node in a telecommunications network, wherein the telecommunications network comprises a server responsible for providing telephony services including extension number dialing telephony services to a plurality of end devices, wherein the server is located in a first network in the telecommunications network, wherein the plurality of end devices comprises at least a first group of end devices located in a second, different network in the telecommunications network, wherein the first network is connected to the second network by a communications link, wherein the system comprises at least one memory including computer program code; and at least one processor in data communication with the at least one memory, wherein the at least one processor is configured to, at a network node located in the second network in the telecommunications network:

monitor signaling messages transmitted between the server and end devices in the at least first group, each monitored signaling message comprising a telephone dialing number for a given end device in the at least first group and an extension number for the given end device;

on the basis of the monitoring, store mapping data comprising mappings between telephone dialing numbers and extension numbers for end devices in the at least first group; and in response to detecting a loss of connectivity in the communications link between the first network in the telecommunications network and the second network in the telecommunications network, process extension number dialing request messages received from end devices in the first group according to a detected loss of connectivity operating mode, wherein the detected loss of connectivity operating mode processing is carried out at least in part on the basis of the stored mapping data.

22. A non-transitory computer-readable storage medium comprising computer-executable instructions which, when executed by a processor, cause a computing device to perform a method of operating a network node in a telecommunications network, wherein the telecommunications network comprises a server responsible for providing telephony services including extension number dialing telephony services to a plurality of end devices, wherein the server is located in a first network in the telecommunications network, wherein the plurality of end devices comprises at least a first group of end devices located in a second, different network in the telecommunications network, and wherein the first network is connected to the second network by a communications link, the method comprising, at a network node located in the second network in the telecommunications network:

monitoring signaling messages transmitted between the server and end devices in the at least first group, each monitored signaling message comprising a telephone dialing number for a given end device in the at least first group and an extension number for the given end device;

on the basis of the monitoring, storing mapping data comprising mappings between telephone dialing numbers and extension numbers for end devices in the at least first group; and in response to detecting a loss of connectivity in the communications link between the first network in the telecommunications network and the second network in the telecommunications network, processing extension number dialing request messages received from end devices in the first group according to a detected loss of connectivity operating mode, wherein the detected loss of connectivity operating mode processing is carried out at least in part on the basis of the stored mapping data.

* * * * *